(12) United States Patent  
Hayakawa

(10) Patent No.: US 7,957,063 B2
(45) Date of Patent: Jun. 7, 2011

(54) DIFFRACTIVE OPTICAL DEVICE, OPTICAL SYSTEM USING THE DIFFRACTIVE OPTICAL DEVICE AND METHOD FOR MANUFACTURING DIFFRACTIVE OPTICAL DEVICE

(75) Inventor: Satoshi Hayakawa, Ichikawa (JP)

(73) Assignee: Nikon Corporation, Tokyo (JP)

( * ) Notice: Subject to any disclaimer, the term of this patent is extended or adjusted under 35 U.S.C. 154(b) by 470 days.

(21) Appl. No.: 12/279,324

(22) PCT Filed: Jun. 7, 2007

(86) PCT No.: PCT/JP2007/061950
§ 371 (c)(1),
(2), (4) Date: Aug. 13, 2008

(87) PCT Pub. No.: WO2007/145263
PCT Pub. Date: Dec. 21, 2007

(65) Prior Publication Data
US 2009/0059376 A1 Mar. 5, 2009

(30) Foreign Application Priority Data

Jun. 16, 2006 (JP) .................................. 2006-167333

(51) Int. Cl.
*G02B 5/18* (2006.01)
(52) U.S. Cl. ....................................................... 359/576
(58) Field of Classification Search ................... 359/576
See application file for complete search history.

(56) References Cited

U.S. PATENT DOCUMENTS

| 6,122,104 A | 9/2000 | Nakai et al. |
| 6,157,488 A | 12/2000 | Ishii |
| 6,760,159 B2 | 7/2004 | Nakai et al. |
| 2001/0013975 A1 | 8/2001 | Nakai |
| 2003/0161044 A1 | 8/2003 | Tokoyoda |
| 2004/0051949 A1 | 3/2004 | Ukuda |
| 2005/0190459 A1 | 9/2005 | Ukuda |
| 2006/0268414 A1 | 11/2006 | Tokoyoda |

FOREIGN PATENT DOCUMENTS

| CN | 1487310 A | 4/2004 |
| DE | 698 18 583 T2 | 8/2004 |
| EP | 0 895 100 B1 | 2/1999 |
| EP | 1 394 574 A2 | 3/2004 |
| JP | 09-127322 A | 5/1997 |
| JP | 11-044808 A | 2/1999 |
| JP | 2003-227912 A | 8/2003 |
| JP | 2003-320540 A | 11/2003 |
| JP | 2004-126061 A | 4/2004 |
| JP | 2004-145273 A | 5/2004 |

*Primary Examiner* — Alessandro Amari
(74) *Attorney, Agent, or Firm* — Miles & Stockbridge P.C.

(57) ABSTRACT

A diffractive optical device 1 is composed of resins of different materials, and has a laminated structure, in which a second diffractive device element 20 is bonded between a first diffractive device element 10 and a third diffractive device element 30; a first diffraction optical surface 6 is formed by adhering a diffraction grating groove 2, which is formed on the first diffractive device element 10, to a diffraction grating groove 3, which is formed on the second diffractive device element 20, on a bonding surface of the first diffractive device element 10 and the second diffractive device element 20, a second diffractive optical surface 7 is formed by adhering a diffraction grating groove 4, which is formed on the second diffractive device element 20, and a diffraction grating groove 5, which is formed on the third diffractive device element 30, on a bonding surface of the second diffractive device element 20 and the third diffractive device element 30, and both the non-bonded surface of the first diffractive device element 10 and the non-bonded surface of the third diffractive device element 30 are composed of planes.

7 Claims, 9 Drawing Sheets

DIFFRACTIVE OPTICAL DEVICE, OPTICAL SYSTEM USING THE DIFFRACTIVE OPTICAL DEVICE AND METHOD FOR MANUFACTURING DIFFRACTIVE OPTICAL DEVICE

TECHNICAL FIELD

The present invention relates to a diffractive optical device that generates diffracted luminous flux of an incident light, an optical system constituted in use of this diffractive optical device, and a method for manufacturing the diffractive optical device.

TECHNICAL BACKGROUND

A diffractive optical device is an optical device having a grating structure composed of about several hundreds of equally distanced small slits or grooves per micro distance (about 1 mm), and when light enters, a diffracted luminous flux is generated in a direction determined by the pitch (distance) of the slits or grooves and the wavelength of the light. Such a diffractive optical device is used for various optical systems, and one used as a lens that condenses the diffracted lights at a specific degree, for example, is known. If a diffractive optical device is used for an optical system, a chromatic aberration correction effect can be implemented.

As such a diffractive optical device, a multi-layered diffractive optical device as shown in FIG. 12 has recently been proposed. According to the multi-layered diffractive optical device shown in FIG. 12, on a bonding surface of a first diffractive device element 10' formed of glass and a second diffractive device element 20' formed of resin, a diffractive optical surface 6', where a diffraction grating groove formed on the first diffractive device element 10' and a diffraction grating groove formed on the second diffractive device element 20' are adhered to each other, is formed. This type of a diffractive optical device in which one diffractive device element and the other diffractive device element are contacted is called a "contact type". By using the multi-layer diffractive optical device, high diffraction efficiency can be obtained not only at a specific wavelength, but at a wide wavelength range as well.

Besides the above mentioned contact type, the multi-layered diffractive optical device also has a separation type, where two diffractive device elements are disposed facing each other at a distance. In the case of a separation type diffractive optical device, [the two diffractive device elements] having different grating heights, are molded by a die matching the respective grating form. Also in order to satisfy the diffraction condition and obtain high diffraction efficiency, the gratings are aligned. In the case of a contact type diffractive optical device, on the other hand, the grating height is the same and molding is possible with gratings adhered, so the influence of errors of grating heights and grating positions on the diffraction efficiency is small. Hence, in the case of the contact type, a diffractive optical device having a high diffraction efficiency can be easily manufactured.

Mainly glass and resin are used as a material of a diffractive optical device. An example of a diffractive optical device formed of glass and resin is disclosed in the following document (see Patent Document 1). Generally in order to manufacture a diffractive optical device at high volume and at low cost, a die, where diffraction grating grooves are formed, is molded and transferred to glass and resin. In the case of resin, die can more easily be molded than glass. The cost of material is generally lower for resin than glass.

For the contact type multi-layered diffractive optical device, a type where the medium is composed of two layers (see Japanese Patent Application Laid-Open No. 2004-126061), and a type where the medium is composed of three layers (see Japanese Patent Application Laid-Open No. 2003-227912), for example, are known, and in the case of the three layer type diffractive optical device, the optical path difference $\Delta h$ of the wavelength $\lambda$ of the light is given by $$\Delta h = (n1-n2)h1 + (n2-n3)h2,$$

where a refractive index of the medium d1 is n1, a refractive index of the medium d2 is n2, a refractive index of the medium d3 is n3, a grating height of the diffraction grating groove on the bonding surface of the medium d1 and medium d2 is h1, and a grating height of the diffraction grating groove on the bonding surface of the medium d2 and the medium d3 is h2.

If $\alpha$ is a result when the optical path difference is divided by the wavelength $\lambda$ of the light, $\alpha$ is given as follows, $$\alpha = \{(n1-n2)h1 + (n2-n3)h2\}/\lambda$$

If m is a degree of diffraction, the diffraction efficiency $\eta$ is given as follows, $$\eta = \{\sin \pi(\alpha-m)/(\alpha-m)\}2$$

Compared with the two layer type, the three layer type diffractive optical device can implement higher diffraction efficiency by appropriately selecting the grating heights h1 and h2 of the diffraction grating grooves and the refractive indexes n1, n2 and n3 of the medium. An even higher diffraction efficiency can be implemented by making each medium d1, d2 and d3 of different materials.

DISCLOSURE OF THE INVENTION

Problems to be Solved by the Invention

One problem of the two layer type diffractive optical device stated in Patent Document 1 is that die molding is difficult, since glass is used for one side of the medium constituting the diffractive optical device, and the cost of material is high. If glass is used for the medium, the processing temperature for molding is high, compared with resin, and it takes time to reach the processing temperature, which is another problem. Furthermore in the case of the two layer type diffractive optical device, diffraction efficiency is not as good as the three layer type diffractive optical device. In the case of the three layer type diffractive optical device stated in Patent Document 2, the boundary surface between two media located outside and the air, that is the non-bonded surfaces, are grating forms (discontinuous surfaces) respectively, so a die for forming the non-bonded surface is required, and this portions sometime peel or chip during mold releasing.

With the foregoing in view, it is an object of the present invention to provide a diffractive optical device having a configuration that can make manufacturing easier, while maintaining such performance as diffraction efficiency, superb, an optical system using this diffractive optical device, and a manufacturing method for the diffractive optical device.

Means to Solve the Problems

In order to solve the problems, a diffractive optical device according to the present invention comprises a first to third diffractive device elements composed of resins of different materials, and has a laminated structure, in which the second diffractive device element is bonded between the first diffractive device element and the third diffractive device element, characterized in that a first diffractive optical surface is formed by adhering a diffraction grating groove, which is formed on the first diffractive device element, and a diffraction grating groove, which is formed on the second diffractive device element, on a bonding surface of the first diffractive device element and the second diffractive device element, a second diffractive optical surface is formed by adhering a diffraction grating groove, which is formed on the second diffractive device element, and a diffraction grating groove, which is formed on the third diffractive device element, on a bonding surface of the second diffractive device element and the third diffractive device element, and both the non-bonded surface of the first diffractive device element and the non-bonded surface of the third diffractive device element are composed of continuous surfaces.

Where a refractive index of the first diffractive device element with the d-line is $n1$, a refractive index of the second diffractive device element with the d-line is $n2$, a refractive index of the third diffractive device element with the d-line is $n3$, an Abbe number of the first diffractive device element is $vd1$, an Abbe number of the second diffractive device element is $vd2$, and the Abbe number of the third diffractive device element is $vd3$, at least one of expressions $-0.001425<(n1-n2)/(vd1-vd2)$ and $-0.001425<(n2-n3)/(vd2-vd3)$ is satisfied.

In the diffractive optical device having the above configuration, it is preferable that the diffraction grating grooves formed in the first to third diffractive device elements have a serrated cross-section where an inclination surface and an upright surface are alternately arranged, and the inclination direction of the inclination surface of the diffraction grating grooves of the first and second diffractive device elements constituting the first diffractive optical surface, and the inclination direction of the inclination surface of the diffraction grating grooves of the second and third diffractive device elements constituting the second diffractive optical surface are the same.

In the diffractive optical device having the above configuration, it is preferable that where a refractive index of the first diffractive device element with the d-line is $n1$, a refractive index of the second diffractive device element with the d-line is $n2$, a refractive index of the third diffractive device element with the d-line is $n3$, an Abbe number of the first diffractive device element is $vd1$, an Abbe number of the second diffractive device element is $vd2$, and an Abbe number of the third diffractive device element is $vd3$, at least one condition out of the first condition $n1>1.54000$, $45<vd1<55$, the second condition $n2>1.54000$, $45<vd2<55$, and the third condition $n3>1.54000$, $45<vd3<55$ is satisfied.

In the diffractive optical device having the above configuration, it is preferable that all of the first to third diffractive device elements are formed of a UV-curable resin material.

To solve the above problem, an optical system according to the present invention comprises a first lens group having a positive refractive power and a second lens group having a negative refractive power disposed in order from an object side to an image side, and is constructed so as to expand a focal length of a main lens disposed to the image side of the second lens group, characterized in that at least one of the first lens group and the second lens group has the diffractive optical device mentioned above.

To solve the above problem, a method for manufacturing a diffractive optical device according to the present invention comprises a first step of dripping a first resin, which is a material of the above mentioned first diffractive device element, onto a substrate having a continuous surface, a second step of forming a diffraction grating groove on the first resin, a third step of curing the first resin, a fourth step of dripping a second resin, which is a material of the above mentioned second diffractive device element, onto the diffraction grating groove of the first resin, a fifth step of forming a diffraction grating groove in the second resin, a sixth step of curing the second resin, a seventh step of dripping a third resin, which is a material of the above mentioned third diffractive device element, onto the diffraction grating groove of the second resin, an eighth step of curing the third resin, and a ninth step of forming a continuous surface on the third resin.

In the method for manufacturing a diffractive optical device, it is preferable that the continuous surface is a plane surface or a curved surface.

Advantageous Effects of the Invention

According to the diffractive optical device, the optical system using the diffractive optical device and the method for manufacturing the diffractive optical device, a diffractive optical device which excels in mass productivity, processability and cost and has high diffraction efficiency in a wide wavelength range can be implemented by appropriately selecting the resin material and the height of the diffraction grating grooves.

DESCRIPTION OF THE PREFERRED EMBODIMENT

Figure 1:
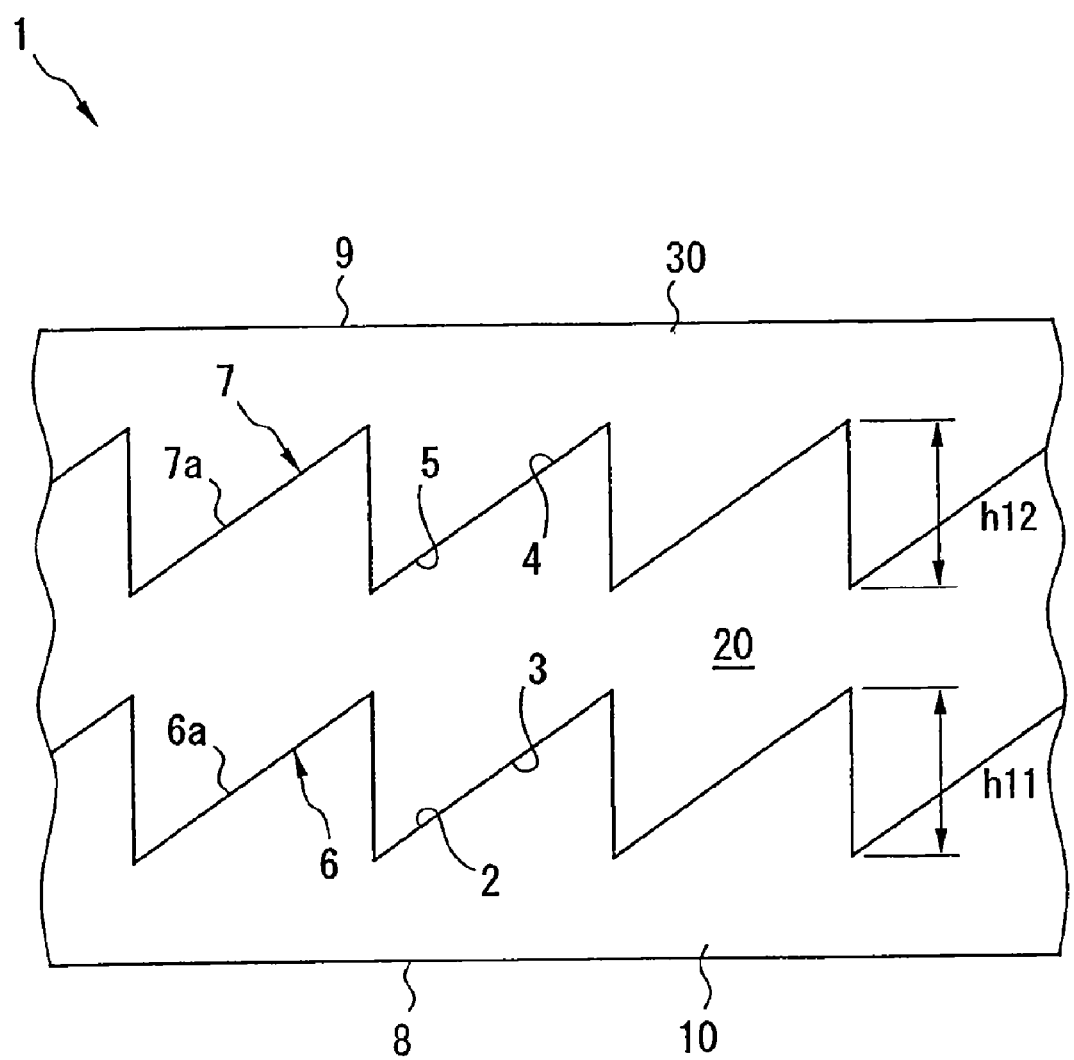
FIG. 1 is a cross-sectional view depicting a diffractive optical device according to Example 1.
Figure 2A:
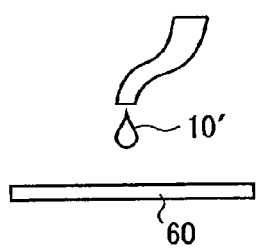
FIG. 2 are diagrams depicting the manufacturing steps of the diffractive optical device in the sequence of (A) to (L)
Figure 2E:
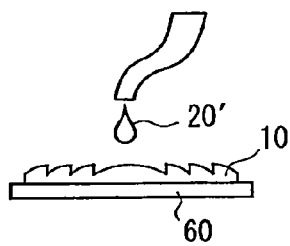
Figure 2I:
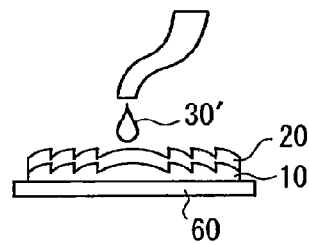
Figure 2B:
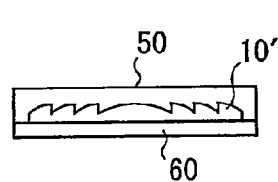
Figure 2F:
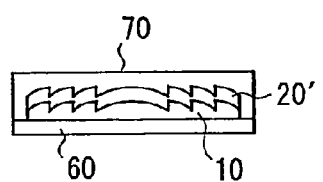
Figure 2J:
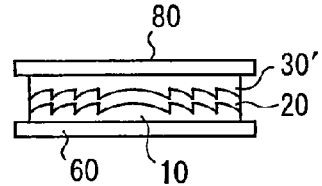
Figure 2C:
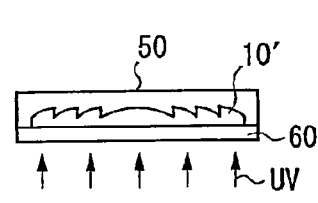
Figure 2G:
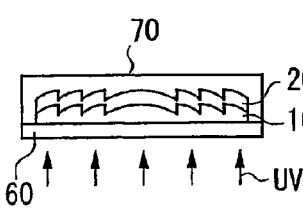
Figure 2K:
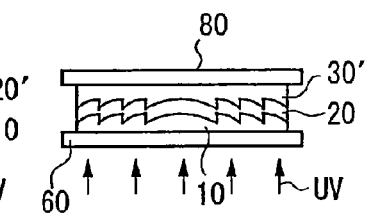
Figure 2D:
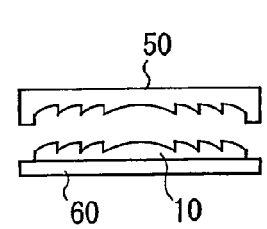
Figure 2H:
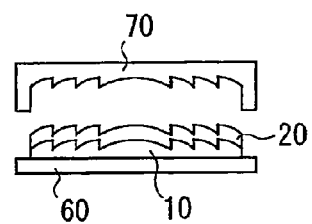
Figure 2L:
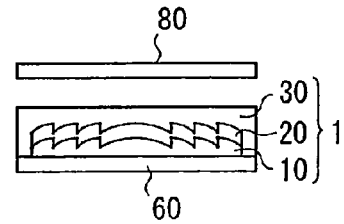

Preferred embodiments of the present invention will now be described with reference to the drawings. FIG. 1 is a cross-sectional view depicting a diffractive optical device according to an embodiment of the present invention. The diffractive optical device 1 of the present embodiment comprises a first diffractive device element 10, a second diffractive device element 20 and a third diffractive device element 30 comprised of resins of mutually different materials (UV-curable resins), and has a laminated structure where the second diffractive device element 20 is between the first diffractive device element 10 and the third diffractive device element 30. A first diffractive optical surface 6 is formed by adhering a diffusion grating groove 2, which is formed on the first diffractive device element 10, and a diffraction grating groove 3, which is formed on the second diffractive device element 20, and a second diffractive optical surface 7 is formed by adhering a diffraction grating groove 4, which is formed on the second diffractive device element 20 and a diffraction grating groove 5, which is formed on the third diffractive device element 30. In this embodiment, the diffraction grating grooves 2, 3, 4 and 5 present a serrated cross-section, where the inclined surface and the upright surface are alternately arranged at a predetermined cycle, as shown in FIG. 1, but the present invention is not limited to this form.

In the diffractive optical device, both the non-bonded surface 8 of the first diffractive device element 10 and the non-bonded surface 9 of the third diffractive device element 30 are composed of continuous surfaces. "Continuous surface" here refers to a plane or curved surface, and refers to the absence of an inflection point on the non-bonded surface in the case of a curved surface. The diffractive optical device can be easily manufactured if the non-bonded surface 8 of the first diffractive device element 10 and the non-bonded surface 9 of the third diffractive device element 30 are composed of such a continuous surface as a plane and a curved surface.

As FIG. 1 shows, the inclination direction of the inclination surface 6a of the diffraction grating grooves 2 and 3 of the first and second diffractive device elements 10 and 20 constituting the first diffractive optical surface 6, and the inclination direction of the inclination surface 7a of the diffraction grating grooves 4 and 5 of the second and third diffractive device elements 20 and 30 constituting the second diffractive optical surface 7, are the same. If the inclination directions of the inclination surfaces 7a are not the same, the vertex and the vertex of the diffraction grating groove become closer, and a change of thickness of the diffractive device element increases, which makes manufacturing difficult. Also if the diffraction grating grooves are formed on the curved surfaces, releasing the diffractive device element from the die becomes difficult if the inclination directions are not the same. Therefore if the inclination directions of the inclination surfaces 7a are the same, manufacturing becomes easier, and mass productivity excels and manufacturing cost can be suppressed.

The above mentioned diffractive optical device 1 (which is a disk type in the case of the present embodiment) is manufactured as follows. As FIG. 2 shows, a light transmission element 60 (later mentioned material that transmits ultraviolet UV) is prepared. This light transmission element 60 is composed of glass or resin. Along with the light transmission element 60, a first UV-curable resin 10' is prepared.

Then the first UV-curable resin 10' is dripped on the light transmission element 60 (see FIG. 2 (A)). And a die 50, for forming a first diffractive optical device 10 where a predetermined shaped diffraction grating groove is formed, is pressed on the dripping first UV-curable resin 10' (see FIG. 2 (B)). By irradiating the ultraviolet UV from the light transmission element 60 side, the first UV-curable resin 10' is cured (see FIG. 2 (C)). Then the die 50 is released from the cured first UV-curable resin 10' and the light transmission element 60 (see FIG. 2 (D)). Thereby the shape of the diffraction grating groove formed in the die 50 is transferred to the first UV-curable resin 10', and the first diffractive optical device 10 having the diffraction grating groove 2 is formed.

Then an appropriate amount of a second UV-curable resin 20' is dripped on the surface where the diffraction grating groove 2 of the first diffractive optical device 10 is formed, as mentioned above (see FIG. 2 (E)). And a die 70 for forming the second diffractive optical device 20, where a predetermined shaped diffraction grating groove 4 are formed, is pressed on the dripped second UV-curable resin 20' (see FIG. 2 (F)). By irradiating the ultraviolet UV from the light transmission element 60 side, the second UV-curable resin 20' is cured (see FIG. 2 (G)). Then the die 70 is released from the cured second UV-curable resin 20' and the light transmission element 60 (see FIG. 2 (H)). Thereby the second diffractive optical device 20, that is bonded and layered on the first diffractive optical device 20 and has the diffraction grating groove 4, is formed.

Then an appropriate amount of a third UV-curable resin 30' is dripped on the surface where the diffraction grating groove 4 of the second diffractive optical device 20 is formed (see FIG. 2 (I)). And a flat substrate 80, for forming a surface, is pressed on a surface of the dripped third UV-curable resin 30' on the opposite side of the surface where the diffraction grating groove 4 is formed, that is, on a non-bonded surface (see FIG. 2 (J)). By irradiating the ultraviolet UV from the light transmission element 60 side, the third UV-curable resin 30' is curved (see FIG. 2 (K)). Thereby the third diffractive optical device 30, that is bonded and layered on the second diffractive optical device 20, is formed. Finally, the substrate 80 for surface formation is released, whereby the multilayered (three layer) diffractive optical device 1 of the present invention, which is comprised of the first diffractive optical device (first UV-curable resin) 10, the second diffractive optical device (second UV-curable resin) 20 and the third diffractive optical device (third UV-curable resin) 30, completes (see FIG. 2 (L)).

The surface of the light transmission element 60 and the substrate 80 for surface formation are illustrated as a plane in FIG. 2, but these surfaces are actually a general lens surface, that is, a plane, a spherical or an aspherical surface. The diffractive optical device can also be formed by dripping a UV-curable resin on the die or the substrate, and pressing the light transmission element or diffraction grating groove thereto.

In this diffractive optical device 1, the materials of the first to third diffractive device elements 10 to 30 are all UV-curable resin, which is immediately cured at room temperature if ultraviolet is irradiated onto the UV-curable resin, so processing time is short compared with thermosetting resin, which requires heating for curing. Another problem of thermosetting resin is that thermal deformation easily occurs, and therefore manufacturing is difficult, but if UV-curable resin is used, little thermal deformation occurs, so the dimensional accuracy of the final product is good, and such a problem as cracking due to thermal deformation does not occur. Also compared to glass, the processing temperature of UV-curable resin material is lower than glass, so little deformation occurs.

According to the present diffractive optical device 1, where a refractive index of the first diffractive device element 10 with the d-line is n1, a refractive index of the second diffractive device element 20 with the d-line is n2, a refractive index of the third diffractive device element 30 with the d-line is n3, an Abbe number of the first diffractive device element 10 is vd1, an Abbe number of the second diffractive device element 20 is vd2, and an Abbe number of the third diffractive device element 30 is vd3, at least one of the following Expressions (1) and (2) is satisfied.

$$-0.001425 < (n1-n2)/(vd1-vd1) \quad (1)$$

$$-0.001425 < (n2-n3)/(vd2-vd3) \quad (2)$$

Here, conditional Expression (1) specifies a ratio of the difference of the refractive indexes and the difference of the Abbe numbers in the first diffractive device element 10 and the second diffractive device element 20, and the conditional Expression (2) specifies a difference of the refractive indexes and the difference of the Abbe numbers in the second diffractive device element 20 and the third diffractive device element 30. If the ratio of the difference of the refractive indexes and the difference of the Abbe numbers becomes less than the lower limit, this means that the difference of the refractive indexes with respect to the difference of the Abbe numbers decreases. If the difference of the refractive indexes with respect to the difference of the Abbe numbers decreases, increasing the grating height of the diffraction grating grooves is required in order to satisfy the diffraction conditions. Increasing the grating height causes a drop in the diffraction efficiency when the angle of the incident light that enters the diffractive optical surface is great. In other words, the incident angle characteristic of the diffraction efficiency drops. Hence in the diffractive device element 1 of the present invention, the ratio of the difference of the refractive indexes and the Abbe numbers is set to be greater than the lower limit value. In the present invention, higher diffraction efficiency can be obtained if the lower limit value of conditional Expression (1) is set to −0.000040, so as to be higher than −0.001425.

Also according to the diffractive optical device 1, where a refractive index of the first diffractive device element 10 with the d-line is n1, a refractive index of the second diffractive device element 20 with the d-line is n2, a refractive index of the third diffractive device element 30 with the d-line is n3, an Abbe number of the first diffractive device element 10 is vd1, an Abbe number of the second diffractive device element 20 is vd2, and an Abbe number of the third diffractive device element 30 is vd3, it is preferable to satisfy at least one of the following three conditions, that is, the first condition (Expressions (3) and (4)), the second condition (Expressions (5) and (6)), and the third condition (Expressions (7) and (8)).

$$n1 > 1.54000 \quad (3)$$

$$45 < vd1 < 55 \quad (4)$$

$$n2 > 1.54000 \quad (5)$$

$$45 < vd2 < 55 \quad (6)$$

$$n3 > 1.54000 \quad (7)$$

$$45 < vvd3 < 55 \quad (8)$$

If the refractive indexes n1 to n3 become lower than the lower limit 1.54000 shown in Expression (3), (5) and (7), increasing the grating height of the diffraction grating grooves is required in order to satisfy the diffraction conditions. Increasing the grating height causes a drop in the diffraction efficiency when the angle of the incident light that enters the diffractive optical surface is great. In other words, the incident angle characteristic of the diffraction efficiency drops. Hence, it is demanded that the refractive indexes n1 to n3 satisfy at least one of Expression (3), (5) and (7), but it is preferable that the lower limit value thereof is 1.55000 in order to implement higher diffraction efficiency.

If the Abbe numbers vd1 to vd3 are outside the range shown in Expression (4), (6) and (8), obtaining high diffraction efficiency in a wide wavelength range becomes impossible. Therefore it is demanded that Abbe numbers vd1 to vd3 satisfy at least one of Expressions (4), (6) and (8), but it is preferable that the lower limit is set to 48, and the upper limit is set to 52, in order to implement high diffraction efficiency in a wider wavelength range.

EXAMPLES

Each example will now be described.

Example 1

FIG. 1 shows a configuration of Example 1. As FIG. 1 shows, a first diffractive optical surface 6 is formed by adhering a diffraction grating groove 2, which is formed on a first diffractive device element 10, and a diffraction grating groove 3, which is formed on a second diffractive device element 20, on a bonding surface of the first diffractive device element 10 and the second diffractive device element 20, and a second diffractive optical surface 7 is formed by adhering a diffraction grating groove 4, which is formed on a second diffractive device element 20, and a diffraction grating groove 5, which is formed on a third diffractive device element 30, on a bonding surface of the second diffractive device element 20 and the third diffractive device element 30. The first to the third diffractive device elements 10 to 30 are bonded so that the pitch of the diffraction grating groove 2 (diffraction grating groove 3) and the pitch of the diffraction grating groove 4 (diffraction grating groove 5) are the same. The inclination direction of the inclination surface 6a of the diffraction grating groove 2 (diffraction grating groove 3) and the inclination direction of the inclination surface 7a of the diffraction grating groove 4 (diffraction grating groove 5) are the same. The grating height of each diffraction grating groove is optimized so that the diffraction efficiency of the diffracted light of the first degree becomes high in a wide wavelength range, and the grating height h11 of the diffraction grating groove 2 and the grating height h12 of the diffraction grating groove 4 are assumed to be h11=173.85 μm and h12=44.83 μm. Table 1 shows the values corresponding to the conditional Expressions (1) to (8) according to Example 1.

TABLE 1

| (1) | (n1 − n2)/(vd1 − vd2) = −0.014272 |
|---|---|
| (2) | (n2 − n3)/(vd2 − vd3) = −0.000032 |
| (3) | n1 = 1.55690 |
| (4) | vd1 = 50.2 |
| (5) | n2 = 1.55349 |
| (6) | vd2 = 50.4 |
| (7) | n3 = 1.55389 |
| (8) | vd3 = 38.1 |

Figure 3:
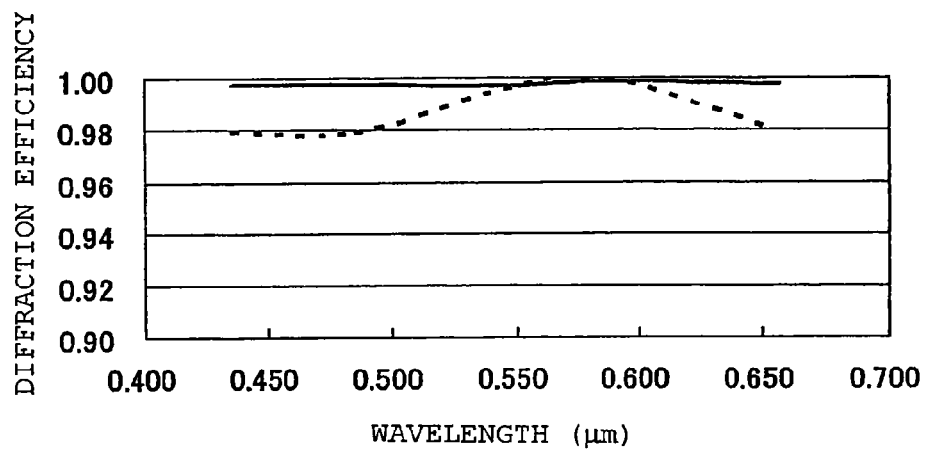
FIG. 3 is a graph depicting the relationship of the incident wavelength to the diffractive optical device and the diffraction efficiency according to Example 1.
Figure 12:
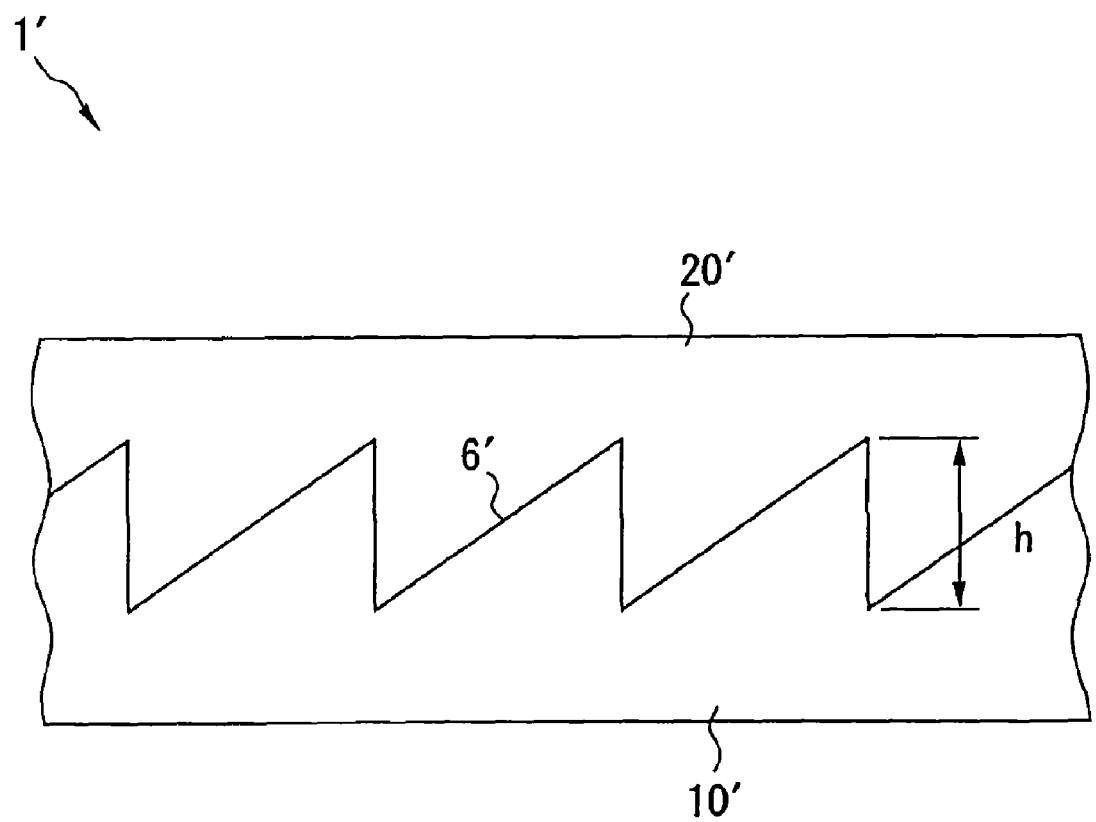
FIG. 12 is a cross-sectional view depicting a configuration of a conventional multi-layered diffractive optical device.

In this way, according to the present example, the above conditional Expressions (1) to (8), except for conditional Expressions (1) and (8), are satisfied. As the solid line in FIG. 3 shows, the diffractive optical device of the present example has a 99% or higher diffraction efficiency in a wide wavelength range of visible light. In FIG. 3, the diffraction efficiency of the two-layer type diffractive optical device in FIG. 12 is shown by a broken line as a comparison. This two-layer type diffractive optical device is disclosed in Patent Document 1, where glass ((nd, vd)=1.59087, 62.3)) is used for the first diffractive device element 10', and UV-curable resin ((nd, vd)=(1.55389, 38.1)) is used for the first diffractive device element 20'. Here nd is a refractive index, and vd is an Abbe number. The grating height h of the diffraction grating groove is 15.8 μm. As FIG. 3 shows, in the case of the two-layer type diffraction optical device, the diffraction efficiency is 97% to 100% in the range of visible light. And compared with this, the diffraction efficiency of the present example has been clearly improved in a wide wavelength range.

Example 2

Figure 4:
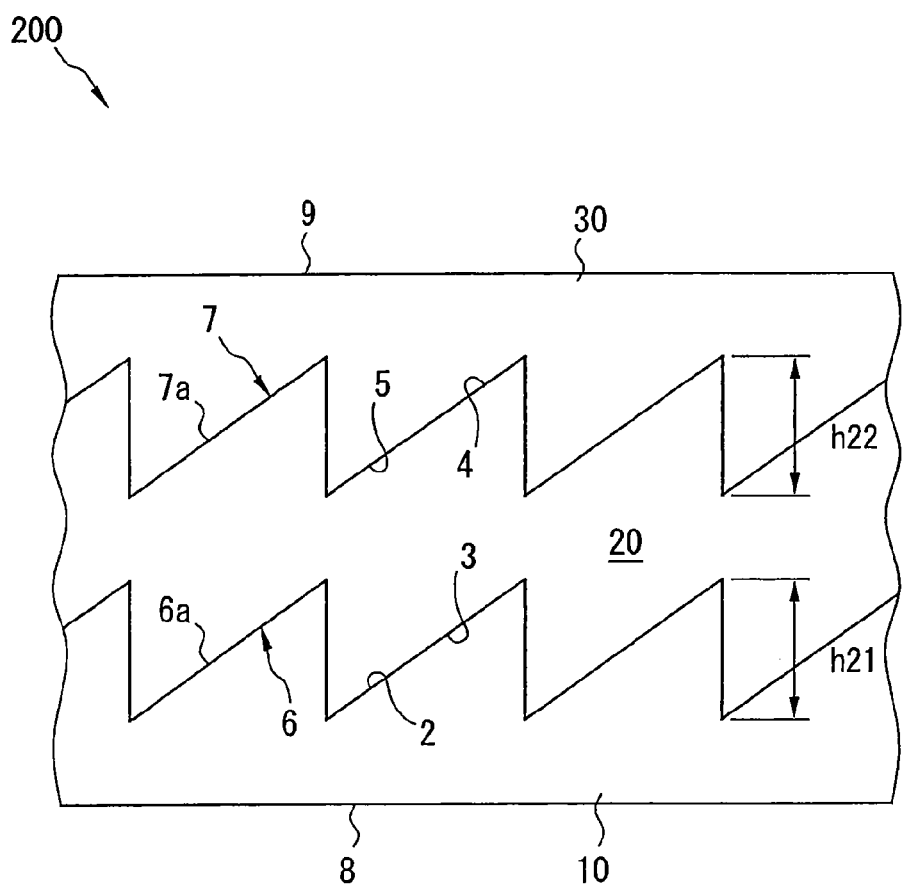
FIG. 4 is a cross-sectional view depicting a diffractive optical device according to Example 2.

FIG. 4 is a configuration of Example 2. Just like Example 1, a first diffractive optical surface 6 is formed on the bonding surface of a first diffractive device element 10 and a second diffractive device element 20, and a second diffractive optical surface 7 is formed on the bonding surface of the second diffractive device element 20 and a third diffractive device element 30. The first to third diffractive device elements 10 to 30 are bonded so that the pitch of the diffraction grating groove 2 (diffraction grating groove 3) and the pitch of the diffraction grating groove 4 (diffraction grating groove 5) are the same. The inclination direction of the inclination surface 6a of the diffraction grating groove 2 (diffraction grating groove 3) and the inclination direction of the inclination surface 7a of the diffraction grating groove 4 (diffraction grating groove 5) are the same. The grating height of each diffraction grating groove is optimized so that the diffraction efficiency of the diffracted light of the first degree becomes high in a wide wavelength range, and the grating height h21 of the diffraction grating groove 2 and the grating height h22 of the diffraction grating groove 4 are assumed to be h21=29.56 μm and h22=10.26 μm. Table 2 shows the values corresponding to the conditional Expressions (1) to (8) according to Example 2.

TABLE 2

| (1) | $(n1 - n2)/(vd1 - vd2) = 0.001763$ |
|---|---|
| (2) | $(n2 - n3)/(vd2 - vd3) = 0.005848$ |
| (3) | $n1 = 1.55690$ |
| (4) | $vd1 = 50.2$ |
| (5) | $n2 = 1.52770$ |
| (6) | $vd2 = 33.6$ |
| (7) | $n3 = 1.55389$ |
| (8) | $vd3 = 38.1$ |

Figure 5:
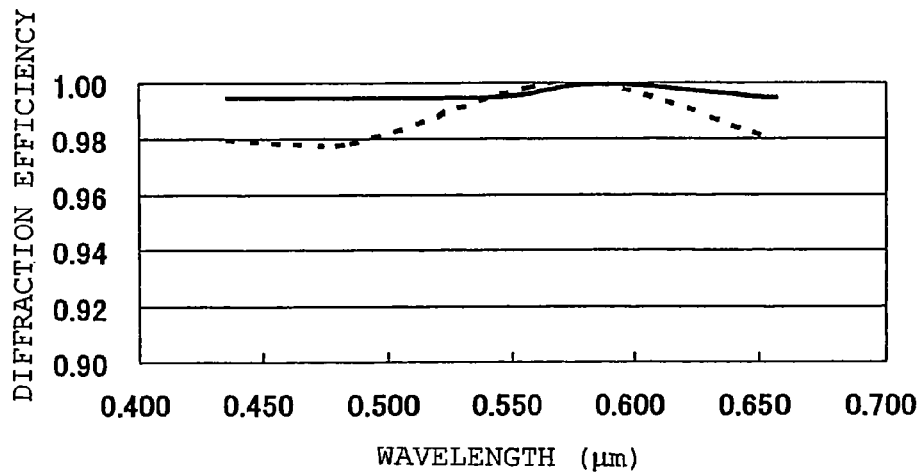
FIG. 5 is a graph depicting the relationship of the incident wavelength to the diffractive optical device and the diffraction efficiency according to Example 2.
Figure 11:
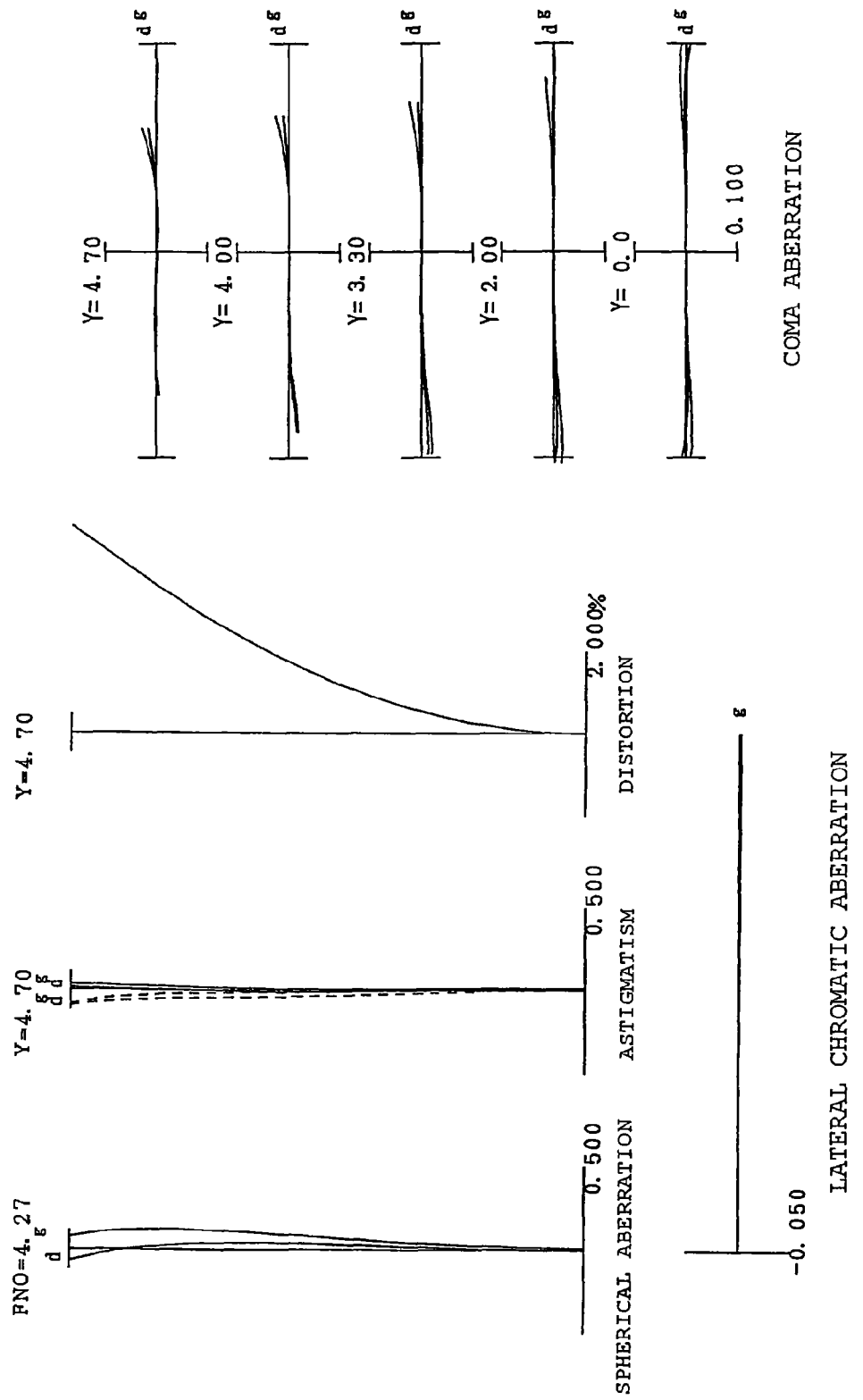
FIG. 11 shows an aberration of Example 5.

In this way, according to the present example, the above conditional Expressions (1) to (8), except for conditional Expressions (5), (6) and (8), are satisfied. As the solid line in FIG. 5 shows, the diffractive optical device of the present example has a 99% or higher diffraction efficiency in a wide wavelength range of the visible light. In FIG. 5, the diffraction efficiency of the two-layer type diffraction optical device in FIG. 11 is shown by a broken line as a comparison. As FIG. 5 shows, in the case of the two-layer type diffractive optical device, the diffraction efficiency is 97% to 100% in the region of visible light, and compared with this, the diffraction efficiency of the present example has clearly improved in a wide wavelength range.

Example 3

Figure 6:
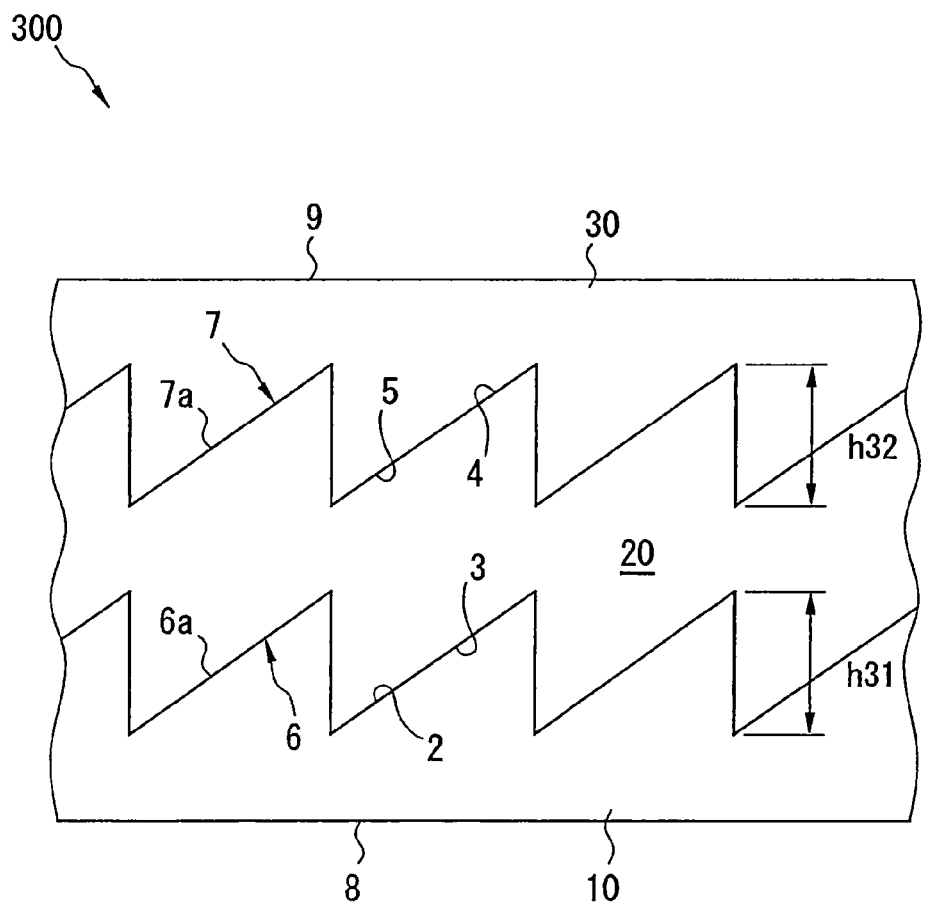
FIG. 6 is a cross-sectional view depicting a diffractive optical device according to Example 3.

FIG. 6 shows a configuration of Example 3. Just like Example 1, a first diffractive optical surface 6 is formed on the bonding surface of a first diffractive device element 10 and a second diffractive device element 20, and a second diffractive optical surface 7 is formed on the bonding surface of the second diffractive device element 20 and a third diffractive device element 30. The first to third diffractive device elements 10 to 30 are bonded so that the pitch of the diffraction grating groove 2 (diffraction grating groove 3) and the pitch of the diffraction grating groove 4 (diffraction grating groove 5) are the same. The inclination direction of the inclination surface 6a of the diffraction grating groove 2 (diffraction grating groove 3) and the inclination direction of the inclination surface 7a of the diffraction grating groove 4 (diffraction grating groove 5) are the same. The grating height of each diffraction grating groove is optimized so that the diffraction efficiency of the diffracted light of the first degree become high in a wide wavelength range, and the grating height h31 of the diffraction grating groove 2 and the grating height h32 of the diffraction grating groove 4 are assumed to be h31=32.68 μm and h32=13.77 μm. Table 3 shows the values corresponding to the conditional Expressions (1) to (8) according to Example 3.

TABLE 3

| (1) | $(n1 - n2)/(vd1 - vd2) = 0.001895$ |
|---|---|
| (2) | $(n2 - n3)/(vd2 - vd3) = 0.017779$ |
| (3) | $n1 = 1.55690$ |
| (4) | $vd1 = 50.2$ |
| (5) | $n2 = 1.52760$ |
| (6) | $vd2 = 34.7$ |
| (7) | $n3 = 1.55389$ |
| (8) | $vd3 = 38.1$ |

Figure 7:
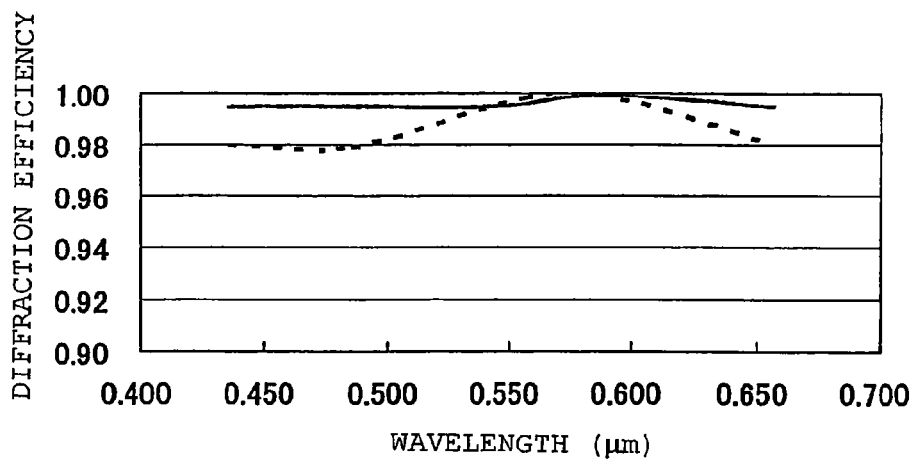
FIG. 7 is a graph depicting the relationship of the incident wavelength to the diffractive optical device and the diffraction efficiency according to Example 3.

In this way, according to the present example, the above conditional Expressions (1) to (8), except for conditional Expressions (5), (6) and (8), are satisfied. As the solid line in FIG. 7 shows, the diffractive optical device of the present example has a 99% or higher diffraction efficiency in a wide wavelength range of the visible light. In FIG. 7, the diffraction efficiency of the two-layer type diffractive optical device in FIG. 11 is shown by a broken line as a comparison. As FIG. 7 shows, in the case of the two-layer type diffractive optical device, the diffraction efficiency is 97% to 100% in the range of visible light, and compared with this, the diffraction efficiency of the present example has clearly improved in a wide wavelength range.

Example 4

Figure 8:
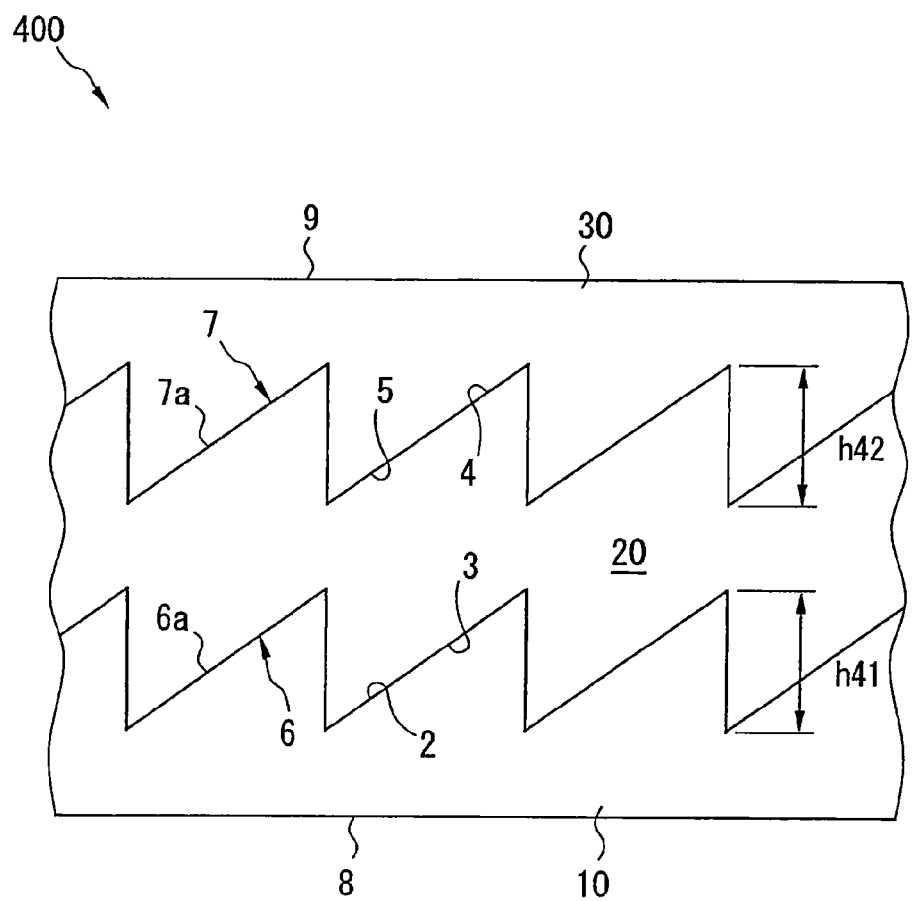
FIG. 8 is a cross-sectional view depicting a diffractive optical device according to Example 4.

FIG. 8 shows a configuration of Example 4. Just like Example 1, a first diffractive optical surface 6 is formed on the bonding surface of a first diffractive device element 10 and a second diffractive element 20, and a second diffractive optical surface 7 is formed on the bonding surface of the second diffractive device element 20 and a third diffractive device element 30. The first to third diffractive device elements 10 to 30 are bonded so that the pitch of the diffraction grating groove 2 (diffraction grating groove 3) and the pitch of the diffraction grating groove 4 (diffraction grating groove 5) are the same. The inclination direction of the inclination surface 6a of the diffraction grating groove 2 (diffraction grating groove 3) and the inclination direction of the inclination surface 7a of the diffraction grating groove 4 (diffraction grating groove 5) are the same. The grating height of each diffraction grating groove is optimized so that the diffraction efficiency of the diffracted light of the first degree becomes high in a wide wavelength range, and the grating height h41 of the diffraction grating groove 2 and the grating height h42 of the diffraction grating groove 4 are assumed to be h41=29.87

μm and h42=23.29 μm. Table 4 shows the values corresponding to the conditional Expressions (1) to (8) according to Example 4.

TABLE 4

| (1) | (n1 − n2)/(vd1 − vd2) = −0.000032 |
|---|---|
| (2) | (n2 − n3)/(vd2 − vd3) = 0.007779 |
| (3) | n1 = 1.55349 |
| (4) | vd1 = 50.4 |
| (5) | n2 = 1.55389 |
| (6) | vd2 = 38.1 |
| (7) | n3 = 1.52760 |
| (8) | vd3 = 34.7 |

Figure 9:
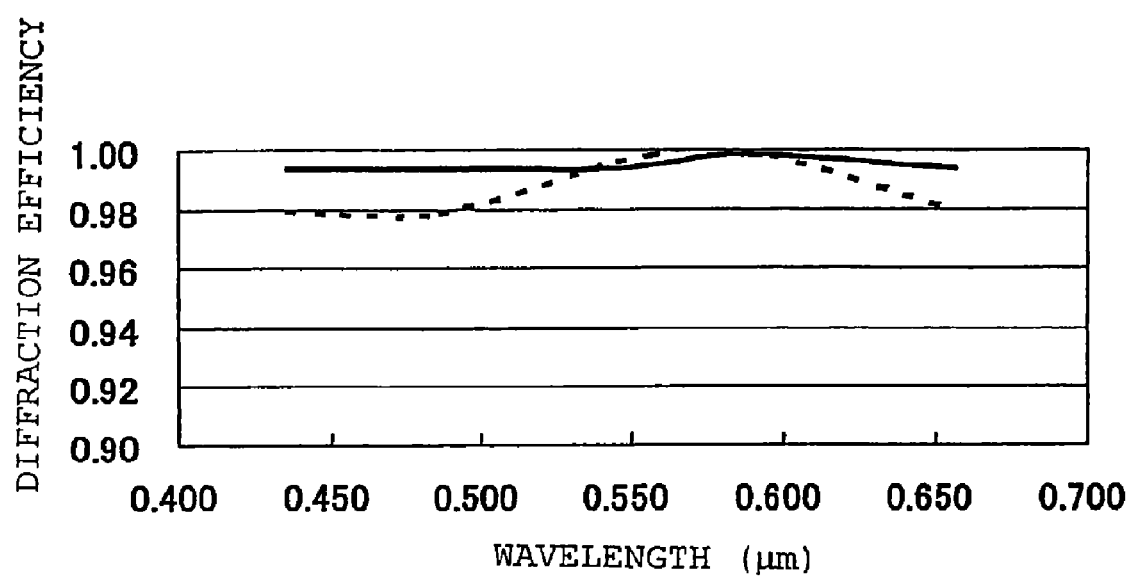
FIG. 9 is a graph depicting the relationship of the incident wavelength to the diffractive optical device and the diffraction efficiency according to Example 4.

In this way, according to the present example, the above conditional Expressions (1) to (8), except for conditional Expressions (6), (7) and (8), are satisfied. As the solid line in FIG. 9 shows, the diffractive optical device of the present example has 99% or higher diffraction efficiency in a wide wavelength range of the visible light. In FIG. 9, the diffraction efficiency of the two-layer type diffractive optical device in FIG. 11 is shown by a broken line as a comparison. As FIG. 9 shows, in the case of the two-layer type diffractive optical device, the diffraction efficiency is 97% to 100% in the range of the visible light, and compared with this, the diffraction efficiency of the present example has clearly improved in a wide wavelength range.

Example 5

Figure 10:
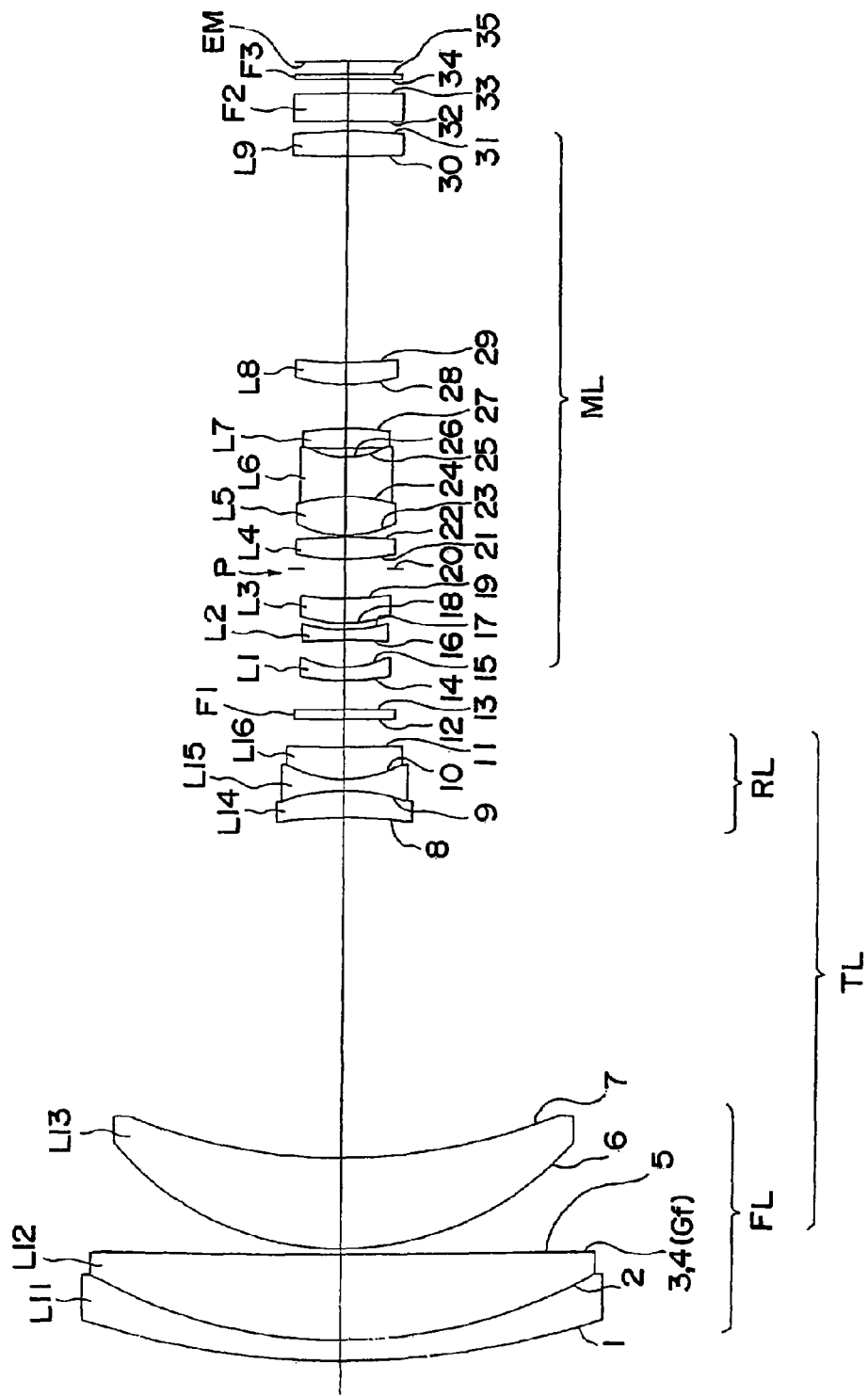
FIG. 10 is a cross-sectional view depicting a lens system having a diffractive optical surface of a diffractive optical device according to Example 5.

FIG. 10 shows a configuration of a lens of an optical system comprised of a tele-converter lens and a main lens according to Example 5. As FIG. 10 shows, the tele-converter lens TL, constituting this optical system, is comprised of a first lens group FL which is disposed to an object side and has a positive refractive power, and a second lens group RL which is disposed to an image side and has a negative refractive power, and the main lens ML, such as an imaging lens, is disposed to an image side of the second lens group RL. And a lens element having a diffractive optical surface is disposed in the first lens group FL.

The main lens ML of the present optical system is comprised of a negative meniscus lens L1 having a convex surface facing the object side, a biconcave lens L2, a positive meniscus lens L3 having a convex surface facing the object side, an aperture stop P, a biconvex lens L4, a biconvex lens L5, a biconcave lens L6 (these lenses L5 and L6 are laminated lenses), a positive meniscus lens L7 having a concave surface facing the object, a positive meniscus lens L8 having a convex surface facing the object, and a biconvex lens L9.

The tele-converter lens TL disposed to the object side of the main lens ML is comprised of the first lens group FL having a positive refractive power, and the second lens group RL having a negative refractive power, and the first lens group FL is further comprised of a negative meniscus lens L11 having a convex surface facing the object side, a positive meniscus lens L12 having a diffractive optical surface Gf on the surface to the image side and having a convex surface facing the object side, (these lenses L11 and L12 are laminated lenses), and a positive meniscus lens L13 having a convex surface facing the object side, which are disposed in order from the object. The second lens group RL is further comprised of a positive meniscus lens L14 having a concave surface facing the object (having a convex surface facing the image), a biconcave lens L15, and a positive meniscus lens L16 having a convex surface facing the object (these lenses L14, L15 and L16 are laminated lenses), which are disposed in order from the object. A protective glass F1 is disposed on an optical path between the positive meniscus lens L16, which is positioned closest to the image in the tele-converter lens TL (in the second lens group RL), and a negative meniscus lens L1, which is positioned closest to the object in the main lens ML, and a parallel plate F2 and a parallel plate F3 are disposed, as filters, on an optical path between the biconvex lens L9, which is positioned closest to the image in the main lens ML and the image surface EM.

The following Table 5 shows data on each lens of Example 5. The surface numbers 1 to 11 in Table 5 are on the tele-converter lens TL, and each number corresponds to the reference numbers 1 to 11 in FIG. 10 respectively. The surface numbers 12 to 33 in Table 1 are on the main lens ML, and each number corresponds to the reference numbers 12 to 33 in FIG. 10 respectively. r in Table 1 indicates a radius of curvature of the lens surface (radius of curvature of a reference spherical surface in the case of an aspherical surface), d indicates a distance of lens surfaces, nd indicates a refractive index with respect to the d-line (wavelength λ=587.6 nm), and vd indicates an Abbe number. A lens surface formed in an aspherical form is indicated with "*" attached to the right side of the surface number. The units of the radius of curvature r, distance to the next lens surface d, and other lengths listed in the data are normally [mm] unless otherwise specified, but are not limited to [mm], and may be another appropriate unit, since a similar optical performance can be obtained even if the optical system is proportionally expanded or proportionally reduced. In the present Example, the surfaces corresponding to the surface numbers 3 and 4 in the tele-converter lens TL correspond to the above mentioned diffractive optical surface Gf, so the lens element (diffractive optical device 1) having the diffractive optical surfaces 6 and 7 according to the present invention corresponds to the lens L12.

The diffractive optical surface Gf is not always disposed in a lens constituting the first lens group FL, but may be disposed in a lens constituting the second lens group RL, or may be disposed both in a lens constituting the first lens group FL and a lens constituting the second lens group RL.

According to the present example, where the height in a direction vertical to the optical axis of an aspherical surface is y, a distance along the optical axis from the tangential plane at the vertex of the aspherical surface to the position on an aspherical surface at the height S (sag amount) is x, a curvature of the reference spherical surface is c, a paraxial curvature is C, a conical coefficient is k, and the aspherical coefficients are $C_2$, $C_4$, $C_6$, $C_8$ and $C_{10}$, the aspherical surface is given by the following expression.

$$C = c + 2C_2$$

$$x = cy^2/\{1+(1-\kappa c^2 y^2)^{1/2}\}+C_2 y^2+C_4 y^4+C_6 y^6+C_8 y^8+C_{10} y^{10}$$

TABLE 5

| Surface Number | r | d | nd | vd |
|---|---|---|---|---|
| (Front converter lens) | | | | |
| 1 | 83.73103 | 2.10 | 1.84666 | 23.8 |
| 2 | 51.92100 | 8.80 | 1.59087 | 62.3 |
| 3 | 800.00000 | 0.00 | 10001 | −3.5 |
| 4* | 800.00000 | 0.20 | 1.55389 | 38.1 |
| 5 | 799.58517 | 0.50 | 1.00000 | |
| 6 | 29.81173 | 8.70 | 1.51680 | 64.1 |
| 7 | 57.75832 | 34.95 | 1.00000 | |
| 8 | −38.44319 | 2.90 | 1.67270 | 32.1 |

TABLE 5-continued

| Surface Number | r | d | nd | vd |
|---|---|---|---|---|
| 9 | −16.82800 | 1.20 | 1.83481 | 42.7 |
| 10 | 12.61180 | 3.20 | 1.69895 | 30.1 |
| 11 | 339.72108 | 3.20 | 1.00000 | |
| | | (Taking lens) | | |
| 12 | 0.00000 | 1.00 | 1.51680 | 64.1 |
| 13 | 0.00000 | 3.04 | 1.00000 | |
| 14 | 24.48279 | 1.30 | 1.80400 | 46.6 |
| 15 | 9.03807 | 2.75 | 1.00000 | |
| 16 | −64.22243 | 1.10 | 1.62041 | 60.3 |
| 17 | 16.64281 | 0.60 | 1.00000 | |
| 18 | 13.25307 | 2.50 | 1.84666 | 23.8 |
| 19 | 31.08525 | 2.30 | 1.00000 | |
| 20 | 0.00000 | 1.72 | 1.00000 | |
| 21 | 26.74950 | 2.10 | 1.80400 | 46.6 |
| 22 | −53.95730 | 0.20 | 1.00000 | |
| 23 | 10.81370 | 3.90 | 1.63930 | 44.9 |
| 24 | −17.36500 | 4.00 | 1.78470 | 26.3 |
| 25 | 8.26660 | 0.85 | 1.00000 | |
| 26 | 42.62930 | 2.10 | 1.48749 | 70.2 |
| 27 | −42.62930 | 4.50 | 1.00000 | |
| 28 | 17.44520 | 2.20 | 1.80440 | 39.6 |
| 29 | 43.13510 | 20.54 | 1.00000 | |
| 30 | 132.15180 | 2.50 | 1.60602 | 57.4 |
| 31* | −36.47286 | 1.00 | 1.00000 | |
| 32 | 0.00000 | 0.50 | 1.51680 | 64.1 |
| 33 | 0.00000 | 4.63 | 1.00000 | |

(Aspherical Data)
[Fourth Surface]

$$\kappa=+1.0000\ C_2=-3.9898\times10^{-9}\ C_4=-3.0119\times10^{-12}$$
$$C_6=6.9671\times10^{-16}\ C_8=-8.4499\times10^{-19}$$

[Thirty First Surface]

$$\kappa=+1.0000\ C_4=1.7718\times10^{-4}\ C_6=1.1671\times10^{-6}\ C_8=-3.7998\times10^{-8}\ C_{10}=4.2480\times10^{-10}$$

FIG. 11 shows various aberrations of the optical system of Example 5. Each aberration diagram shows a result on the d-line and the g-line, where FNO indicates an F number and Y indicates an image height. In the astigmatism aberration diagram, the solid line indicates a sagittal image surface and the broken line indicates a meridional image surface. As each aberration diagram shows, various aberrations are well corrected, and excellent image formation performance is insured in the present Example.

What is claimed is:

1. A diffractive optical device that comprises a first to third diffractive device elements composed of resins of different materials, and that has a laminated structure, in which the second diffractive device element is bonded between the first diffractive device element and the third diffractive element, characterized in that
a first diffractive optical surface is formed by adhering a diffraction grating groove, which is formed on the first diffractive device element, and a diffracting grating groove, which is formed on the second diffractive device element, on a bonding surface of the first diffractive device element and the second diffractive device element,
a second diffractive optical surface is formed by adhering a diffraction grating groove, which is formed on the second diffractive device element, and a diffraction grating groove, which is formed on the third diffractive device element, on a bonding surface of the second diffractive device element and the third diffractive device element, both the non-bonded surface of the first diffractive device element and the non-bonded surface of the third diffractive device element are composed of continuous surfaces, and
where a refractive index of the first diffractive device element with the d-line is n1, a refractive index of the second diffractive device element with the d-line is n2, a refractive index of the third diffractive device element with the d-line is n3, an Abbe number of the first diffractive device element is vd1, an Abbe number of the second diffractive device element is vd2, and an Abbe number of the third diffractive device element is vd3, at least one of the following expressions is satisfied $$-0.001425<(n1-n2)/(vd1-vd2)$$

$$-0.001425<(n2-n3)/(vd2-vd3).$$

2. The diffractive optical device according to claim 1, characterized in that
the diffraction grating grooves formed in the first to third diffractive device elements have a serrated cross-section where an inclination surface and an upright surface are alternately arranged, and
the inclination direction of the inclination surface of the diffraction grating grooves of the first and second diffractive device elements constituting the first diffractive optical surface, and the inclination direction of the inclination surface of the diffraction grating grooves of the second and third diffracting device elements constituting the second diffractive optical surface are the same.

3. The diffractive optical device according to claim 1, characterized in that where a refractive index of the first diffractive device element with the d-line is n1, a refractive index of the second diffractive device element with the d-line is n2, a refractive index of the third diffractive device element with the d-line is n3, an Abbe number of the first diffractive device element is vd1, an Abbe number of the second diffractive device element is vd2, and an Abbe number of the third diffractive device element is vd3, at least one condition out of the first condition,
n1>1.54000
45<vd1<55
the second condition,
n2>1.54000
45<vd2<55
and the third condition,
n3>1.54000
45<vd3<55
is satisfied.

4. The diffractive optical device according to claim 1, characterized in that all of the first to third diffractive device elements are formed of a UV-curable resin material.

5. An optical system that comprises a first lens group having a positive refractive power and a second lens group having a negative refractive power disposed in order from an object side to an image side, and that expand a focal length of a main lens disposed to the image side of the second lens group, characterized in that
at least one of the first lens group and the second lens group has the diffractive optical device according to claim 1.

6. A method for manufacturing a diffractive optical device that comprises a first to third diffractive device elements composed of resins of different materials, and that has a laminated structure, in which the second diffractive device element is bonded between the first diffractive device element and the third diffractive element, said method comprising:

a first step of dripping a first resin, which is a material of the first diffractive device element, onto a substrate having a continuous surface;

a second step of forming a diffraction grating groove on the first resin;

a third step of curing the first resin;

a fourth step of dripping a second resin, which is a material of the second diffractive device element, onto the diffraction grating groove of the first resin;

a fifth step of forming a diffraction grating groove in the second resin;

a sixth step of curing the second resin;

a seventh step of dripping a third resin, which is a material of the third diffractive device element, onto the diffraction grating groove of the second resin;

an eighth step of curing the third resin; and a ninth step of forming a continuous surface on the third resin, where a refractive index of the first diffractive device element with the d-line is n1, a refractive index of the second diffractive device element with the d-line is n2, a refractive index of the third diffractive device element with the d-line is n3, an Abbe number of the first diffractive device element is vd1, an Abbe number of the second diffractive device element is vd2, and an Abbe number of the third diffractive device element is vd3, at least one of the following expressions is satisfied $$-0.001425 < (n1-n2)/(vd1-vd2)$$

$$-0.001425 < (n2-n3)/(vd2-vd3).$$

7. The method for manufacturing a diffractive optical device according to claim 6, characterized in that the continuous surface is a plane surface or curved surface.

* * * * *